United States Patent Office 2,829,151
Patented Apr. 1, 1958

2,829,151
CHLOROTOLOXY-ETHYL PHOSPHATES

Edgar C. Britton and Harold R. Slagh, Midland, Mich., assignors to The Dow Chemical Company, Midland, Mich., a corporation of Delaware No Drawing. Application November 3, 1952
Serial No. 318,511

5 Claims. (Cl. 260—461)

This invention is directed to phosphates and relates particularly to the alkali metal and alkaline earth metal salts of mono-2-(4-chloro-o-toloxy)ethyl phosphoric acid. These compounds are crystalline solids substantially insoluble to moderately soluble in water and substantially insoluble in non-polar organic solvents. The compounds of the present invention have been found to be herbicidally active and are particularly useful for the killing of germinant seed of undesired vegetation.

The new compounds may be prepared by reacting 2-(4-chloro-o-toloxy)ethanol with phosphorus oxychloride to produce a 2-(4-chloro-o-toloxy)ethyl phosphoric dichloride as an intermediate. This intermediate is thereafter reacted successively with water and an alkali metal or alkaline earth metal hydroxide or carbonate to obtain the desired 4-chloro-o-toloxyethyl phosphate product. A representative compound is sodium 2-(4-chloro-o-toloxy) ethyl phosphate having the formula

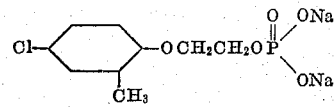

In preparing the chlorotoloxyethyl phosphoric dichloride intermediate, one molecular proportion of 2-(4-chloro-o-toloxy)ethanol is reacted with at least one molecular proportion of phosphorus oxychloride at a temperature of from about 40° to about 80° C. In this phase of the reaction it is preferred to employ a molecular excess of the phosphorus oxychloride and good results are obtained when using from 2 to 5 molecular proportions of phosphorus oxychloride per molecular proportion of the substituted ethanol reactant. The reaction proceeds with the evolution of hydrogen chloride. On completion of the reaction, hydrogen chloride, dissolved in the reaction mixture, is removed as, for example, by passing a current of air or inert gas through the mixture. Any excess phosphorus oxychloride may then be recovered by distillation to obtain the 2-(4-chloro-o-toloxy)ethyl phosphoric dichloride intermediate product as a residue. This product may be further purified as by recrystallization or distillation under reduced pressure if desired. However, for the preparation of technical or commercial products, the crude 2-(4-chloro-o-toloxy)-ethyl phosphoric dichloride can be used directly in the next stage of synthesis.

In practice, the reaction of the substituted ethanol compound with phosphorus oxychloride is conveniently carried out in an inert solvent such as carbon tetrachloride. In such operations, it is efficacious to maintain the temperature of the reaction mixture at the boiling point of the solvent, vaporized solvent being returned to the reaction mixture by reflux condenser. On completion of the reaction, the solvent is recovered in the distillation step as set forth above for the recovery of excess phosphorus oxychloride.

In the second phase of the preparation the 2-(4-chloro-o-toloxy)ethyl phosphoric dichloride intermediate is reacted with water to obtain 2-(4-chloro-o-toloxy)ethyl phosphoric acid. At least two molecular proportions of water are employed for each molecular proportion of the phosphoric dichloride intermediate. Moderate excess of water is not undesirable, however, large excesses are to be avoided since they may result in difficulties in separating the substituted phosphoric acid product. The reaction of the phosphoric dichloride intermediate with water is carried out at a temperature of from about 40° to 100° C. and it is convenient to maintain the reaction mixture under reflux at a temperature of about 100° C. for a period of time to complete the reaction. On completion of the hydrolysis the reaction mixture separates into an acidic aqueous layer and an organic layer. The latter, comprising essentially 2-(4-chloro-o-toloxy)ethyl phosphoric acid, is separated, washed with water and reacted with a stoichiometric equivalent of an alkali or alkaline earth metal hydroxide or carbonate to obtain the desired alkali or alkaline earth metal 2-(4-chloro-o-toloxy)ethyl phosphate. The latter may be further purified by conventional methods although for most uses drying of the product suffices.

The 2-(4-chloro-o-toloxy)ethanol used in preparing the compounds of the present invention may be obtained by reacting an alkali metal 4-chloro-o-cresolate with an equimolecular proportion of ethylene chlorohydrin or ethylene bromohydrin. 2-(4-chloro-o-toloxy)ethanol is a white solid melting at 51° to 53° C. and boiling at 115°–119° C. under 1 millimeter pressure. Said 2-(4-chloro-o-toloxy)ethanol is described and claimed as a new compound in the copending application of Dalton B. McCaskey, Serial No. 262,655, filed December 20, 1951.

The following examples illustrate the invention but are not to be construed as limiting the same.

Example 1

37.2 grams (0.2 mole) of 2-(4-chloro-o-toloxy)ethanol was dissolved with stirring in 200 milliliters of warm carbon tetrachloride and a few crystals of anhydrous magnesium chloride were added. 122 grams (0.8 mole) of phosphorus oxychloride was added rapidly to the above solution and the resulting mixture was heated to its boiling temperature and under reflux for a period of 2 hours. The reaction proceeds with the evolution of hydrogen chloride. Upon completion of the heating period, the reaction mixture was cooled and a current of air blown through it to remove dissolved hydrogen chloride. A total of 7.28 grams (0.2 mole) of hydrogen chloride was recovered. Thereafter, the carbon tetrachloride and excess unreacted phosphorus oxychloride were recovered by distillation to obtain as a crystalline residue a 2-(4-chloro-o-toloxy)ethyl phosphoric dichloride product. This product was dried in a vacuum desiccator and recrystallized twice from carbon tetrachloride. The resulting crystals melted at 90°–92° C.

10 grams (0.033 mole) of the above crystalline product was heated with 10 milliliters of water for about 30 minutes. The reaction mixture separated into an acidic aqueous layer and an oily organic layer. The latter was recovered, washed with water and mixed with stirring with a solution consisting of 2.64 grams (0.066 mole) of sodium hydroxide dissolved in 3 milliliters of water. The resulting solid precipitate was separated and dried to obtain a disodium 2-(4-chloro-o-toloxy)ethyl phosphate product as a white crystalline solid moderately soluble in water and analyzing 9.15 percent by weight phosphorus as compared to 10.0 percent theoretical.

Example 2

93 grams (0.5 mole) of 2-(4-chloro-o-toloxy)ethanol was dissolved in 500 milliliters of warm carbon tetrachloride and a few crystals of anhydrous magnesium chloride and 76.8 grams (0.5 mole) of phosphorus oxychloride added thereto with stirring. This reaction mixture was gradually heated to boiling temperature and maintained under reflux for about 45 minutes. The resulting crude reaction product was cooled and blown with air as in Example 1, with total recovery of 17.53 grams (0.48 mole) of hydrogen chloride. 100 milliliters of water was thereafter added portionwise to the product with stirring. The resulting aqueous mixture was heated to boiling temperature and under reflux for about 30 minutes. An acidic aqueous layer and an oily organic layer were formed. The organic layer, consisting of crude 2-(4-chloro-o-toloxy)ethyl phosphoric acid, was separated and washed with water. One-third of this product was reacted with 16.9 grams (0.33 mole) of finely divided calcium carbonate with stirring. Carbon dioxide was evolved and the reaction mixture was thereafter evaporated to dryness to obtain a calcium 2-(4-chloro-o-toloxy)ethyl phosphate product as a white powder substantially insoluble in water.

*Example 3*

Portions of 2-(4-chloro-o-toloxy)ethyl phosphoric acid prepared by the procedure of Example 2 were reacted with equivalent amounts of potassium hydroxide and magnesium carbonate to produce the corresponding potassium 2-(4-chloro-o-toloxy)ethyl phosphate and magnesium 2-(4-chloro-o-toloxy) ethyl phosphate, respectively. These products were white solids slightly soluble in water.

Areas of greenhouse potting soil were fitted and planted with tampala, radish and lettuce seed. Disodium 2-(4-chloro-o-toloxy)ethyl phosphate was applied to the above fitted and planted area at the rate of 4 pounds per acre. The active phosphate compound was applied in sufficient water to wet thoroughly the surface of the treated soil area. Similar fitted and planted areas were left untreated to serve as a control. Observation several weeks after the treatment showed no apparent germination or growth of any of the test species in the treated area. In contrast, seed of all species in the untreated area had germinated and made vigorous growth.

We claim:
1. As new chemical compounds, phosphates of the class consisting of alkali metal and alkaline earth metal salts of mono-2-(4-chloro-o-toloxy)ethyl phosphoric acid.
2. Sodium 2-(4-chloro-o-toloxy)ethyl phosphate.
3. Potassium 2-(4-chloro-o-toloxy)ethyl phosphate.
4. Calcium 2-(4-chloro-o-toloxy)ethyl phosphate.
5. Magnesium 2-(4-chloro-o-toloxy)ethyl phosphate.

References Cited in the file of this patent
UNITED STATES PATENTS

| | | |
|---|---|---|
| 2,345,690 | Solmssen | Apr. 4, 1944 |
| 2,573,769 | Lambrech | Nov. 6, 1951 |
| 2,708,675 | Slagh | May 17, 1955 |